(12) United States Patent
Godkin

(10) Patent No.: US 6,894,408 B2
(45) Date of Patent: May 17, 2005

(54) LINEAR VOICE COIL ACTUATOR WITH COMPENSATING COILS

(75) Inventor: Mikhail Godkin, San Diego, CA (US)

(73) Assignee: BEI Technologies, Inc., San Francisco, CA (US)

( * ) Notice: Subject to any disclaimer, the term of this patent is extended or adjusted under 35 U.S.C. 154(b) by 0 days.

(21) Appl. No.: 10/741,133

(22) Filed: Dec. 19, 2003

(65) Prior Publication Data

US 2004/0130222 A1 Jul. 8, 2004

Related U.S. Application Data

(63) Continuation of application No. 09/817,925, filed on Mar. 27, 2001, now Pat. No. 6,713,904.
(60) Provisional application No. 60/192,999, filed on Mar. 28, 2000.

(51) Int. Cl.[7] .............................................. H02K 33/18
(52) U.S. Cl. ............................ 310/13; 310/31; 310/27
(58) Field of Search ............................. 310/13, 27, 31; 381/412, 414

(56) References Cited

U.S. PATENT DOCUMENTS

| | | | |
|---|---|---|---|
| 3,619,673 A | 11/1971 | Helms ......................... | 310/13 |
| 3,863,082 A | 1/1975 | Gillott et al. ................. | 310/27 |
| 3,867,675 A | 2/1975 | Kitz et al. ................... | 318/119 |
| 4,243,838 A | * 1/1981 | Coffey ......................... | 381/117 |
| 4,322,584 A | * 3/1982 | Shimada et al. ............ | 381/431 |
| 4,357,490 A | * 11/1982 | Dickey ........................ | 381/336 |
| 5,177,383 A | 1/1993 | Sim ............................. | 310/13 |
| 5,521,774 A | 5/1996 | Parks et al. .................. | 360/81 |
| 5,677,963 A | 10/1997 | Morcos et al. .............. | 381/412 |
| 5,729,617 A | * 3/1998 | Gruber ........................ | 381/412 |
| 5,777,403 A | 7/1998 | Yuan ........................... | 310/12 |

FOREIGN PATENT DOCUMENTS

| | | | | |
|---|---|---|---|---|
| GB | 1308349 | 2/1973 | ......... | H02K/41/02 |
| JP | 224363 | 8/1997 | ......... | H02K/33/18 |
| JP | 308325 | 11/2000 | ......... | H02K/33/18 |

* cited by examiner

Primary Examiner—Darren Schuberg
Assistant Examiner—Judson H. Jones
(74) Attorney, Agent, or Firm—DLA Piper Rudnick Gray Cary US LLP

(57) ABSTRACT

An actuator is provided in which one or more separate compensating coils are employed to alter the distribution of the magnetic flux density in the air gap to produce a substantially constant force throughout the stroke; and in which current in the separate compensating coils can be adjusted with the stroke using separate power supplies and position feedback.

19 Claims, 10 Drawing Sheets

LINEAR VOICE COIL
CLOSED-ENDED ACTUATOR

LINEAR VOICE COIL OPEN-ENDED ACTUATOR

LINEAR VOICE COIL ACTUATOR WITH COMPENSATING COILS

RELATED APPLICATIONS

This application is a continuation of application Ser. No. 09/817,925, filed Mar. 27, 2001 now U.S. Pat. No. 6,713,904, which claims the benefit of U.S. Provisional Application Ser. No. 60/192,999, filed on Mar. 28, 2000.

TECHNICAL FIELD

The present invention is directed generally to linear actuators, and more particularly to compensating magnetic flux generated by the current in the moving coil of voice coil actuators.

BACKGROUND ART

Voice coil actuators are electromagnetic devices which provide force proportional to current applied to a coil. U.S. Pat. No. 5,677,963, assigned to the assignee of the present application, is a example of such voice coil actuators, and incorporated by reference herein in its entirety.

Different configurations of linear voice coil actuators can provide different shapes of the Force vs. Stroke curves. However, these shapes cannot be changed without increasing the power level in the moving coil. But even this measure achieves only limited results due to a given distribution of the primary magnetic field and the armature reaction.

In a servo system, it may be necessary to maintain constant force or constant speed within a certain stroke. U.S. Pat. No. 5,177,383, entitled "Voice coil motor," discloses coils with shorted turns employed in an attempt to achieve such characteristics. Because the turns in those coils are shorted, however, current in those turns cannot be adjusted when the moving coil moves from one position to another.

SUMMARY OF THE INVENTION

In accordance with the present invention, one or more separate compensating coils are employed to alter the distribution of the magnetic flux density in the air gap to produce a constant force throughout as much stroke as possible. Current in the separate compensating coils can be adjusted with the stroke using separate power supplies and a position feedback.

These and other features of the present invention will be more readily appreciated upon consideration of the following detailed description and accompanying drawings.

DETAILED DESCRIPTION

Figure 1:
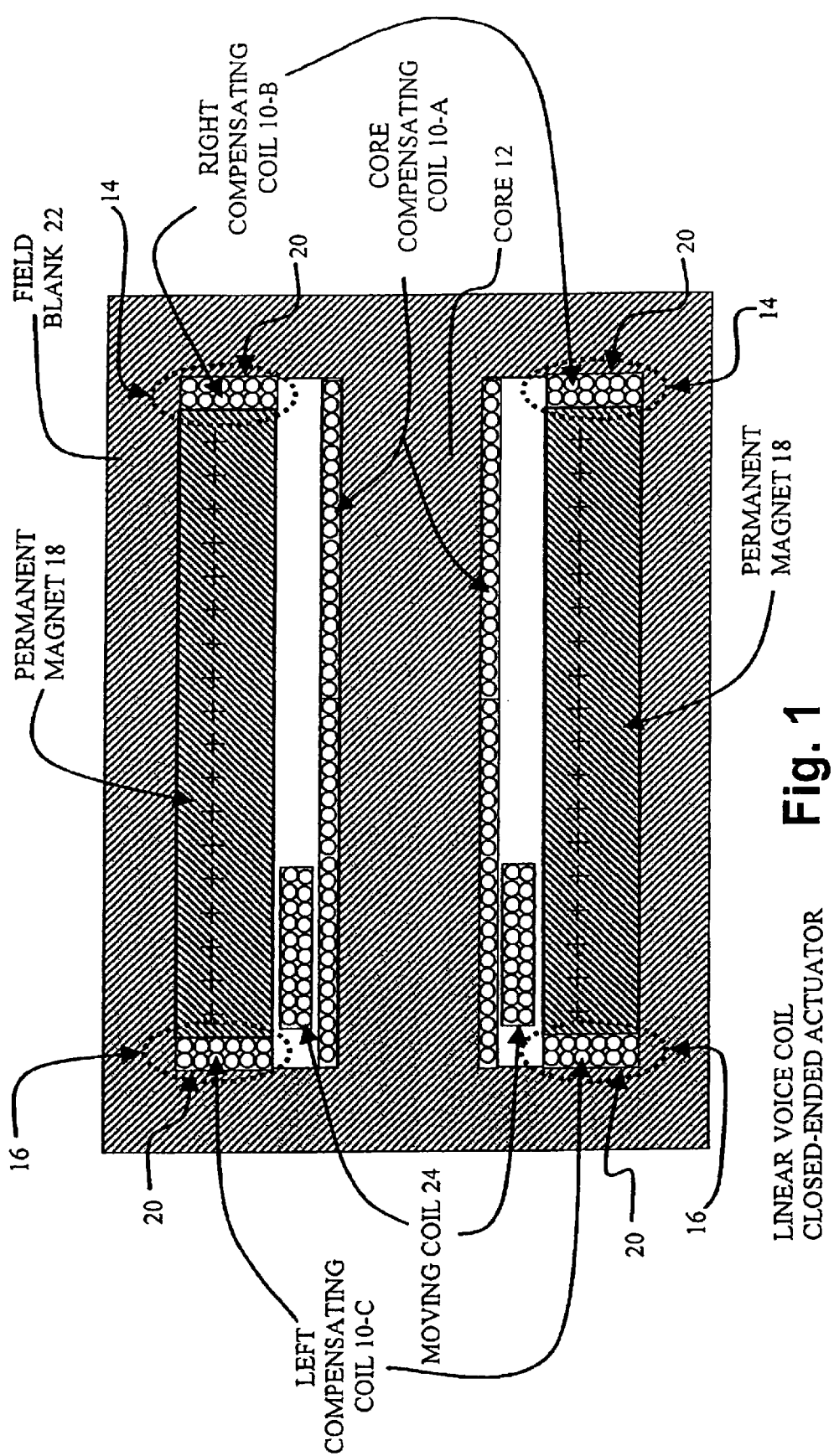
FIG. 1 is a simplified cross section of a closed ended linear voice coil actuator embodiment of the present invention.
Figure 2:
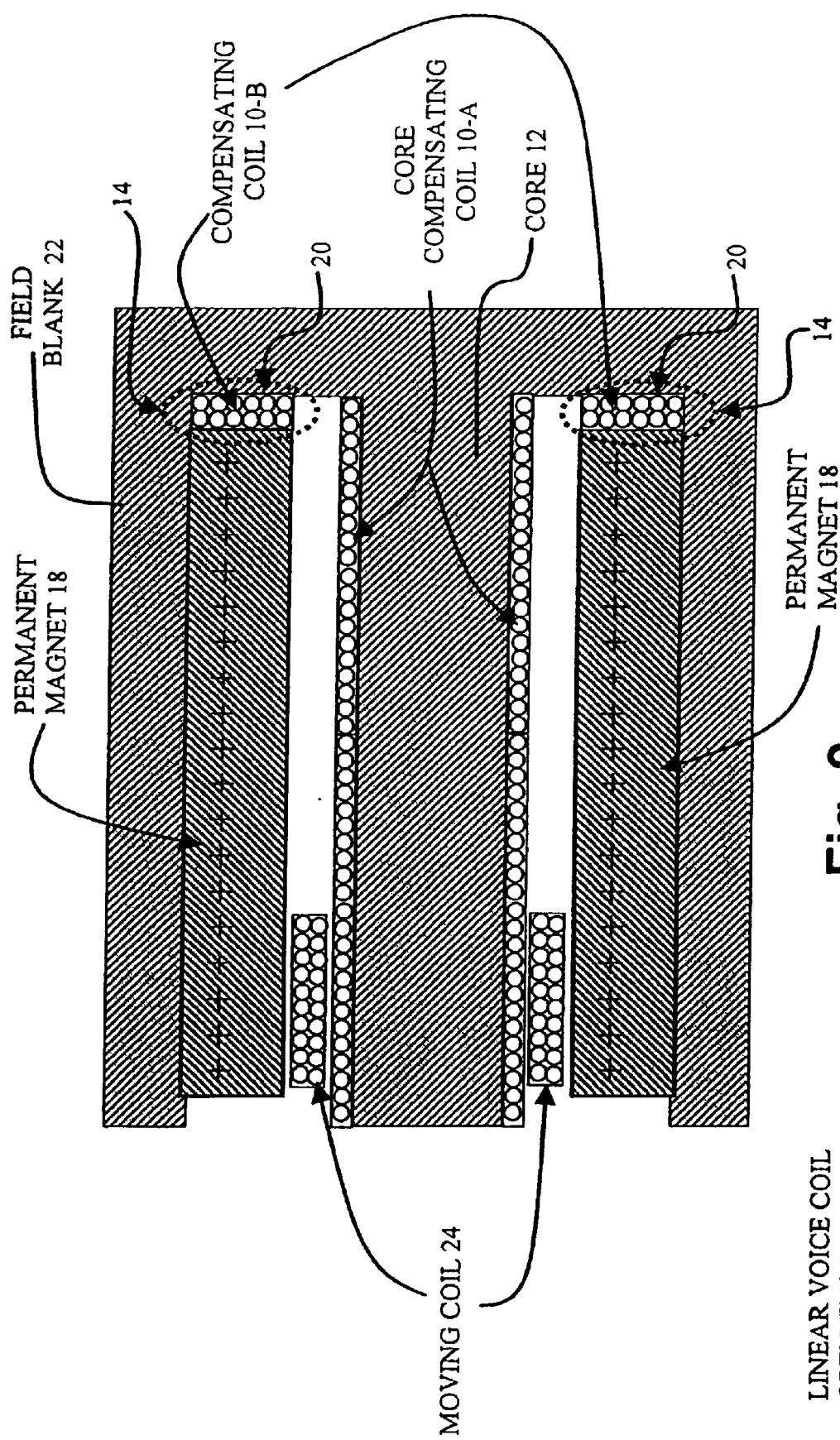
FIG. 2 is a simplified cross section of an open-ended linear voice coil actuator embodiment of the present invention.

Referring to FIG. 1, in accordance with the present invention, compensation coils, for example 10-A, can be wound directly around the core 12; or compensation coils, for example 10-B and 10-C, can be located in the cavities, for example cavities 14 and 16, between the magnets 18 and inside surfaces 20 of the field blank 22 of the actuator. Compensating coils 10-A, 10-B and 10-C can be used in closed-ended actuators, as shown in FIG. 1, as well as open-ended actuators, as shown in FIG. 2.

As can be seen in the closed-ended embodiment of the invention illustrated in FIG. 1, a core compensating coil 10-A is provided. A permanent magnet 18 is positioned with respect to the core 12 so that the longitudinal axis of the permanent magnet 18 is substantially parallel with the axis of the core 12. A field blank 22 made from soft magnetic material is used to form a magnetic circuit between the ends of core 12 and around permanent magnet 18.

A voice coil actuator in accordance with the present invention can have a variety of shapes, including a rectangular configuration and a cylindrical configuration. A rectangular embodiment will be described in the following sections, as an example, it being understood that other shapes are contemplated within the spirit of the present invention. As will be apparent to those skilled in the art, although not shown in the figures, brackets or other linkages can be used to connect the moving coil to the load of the actuator. These brackets or other linkages can extend through longitudinal slots formed in the field blank 22 of the actuator.

Figure 9:
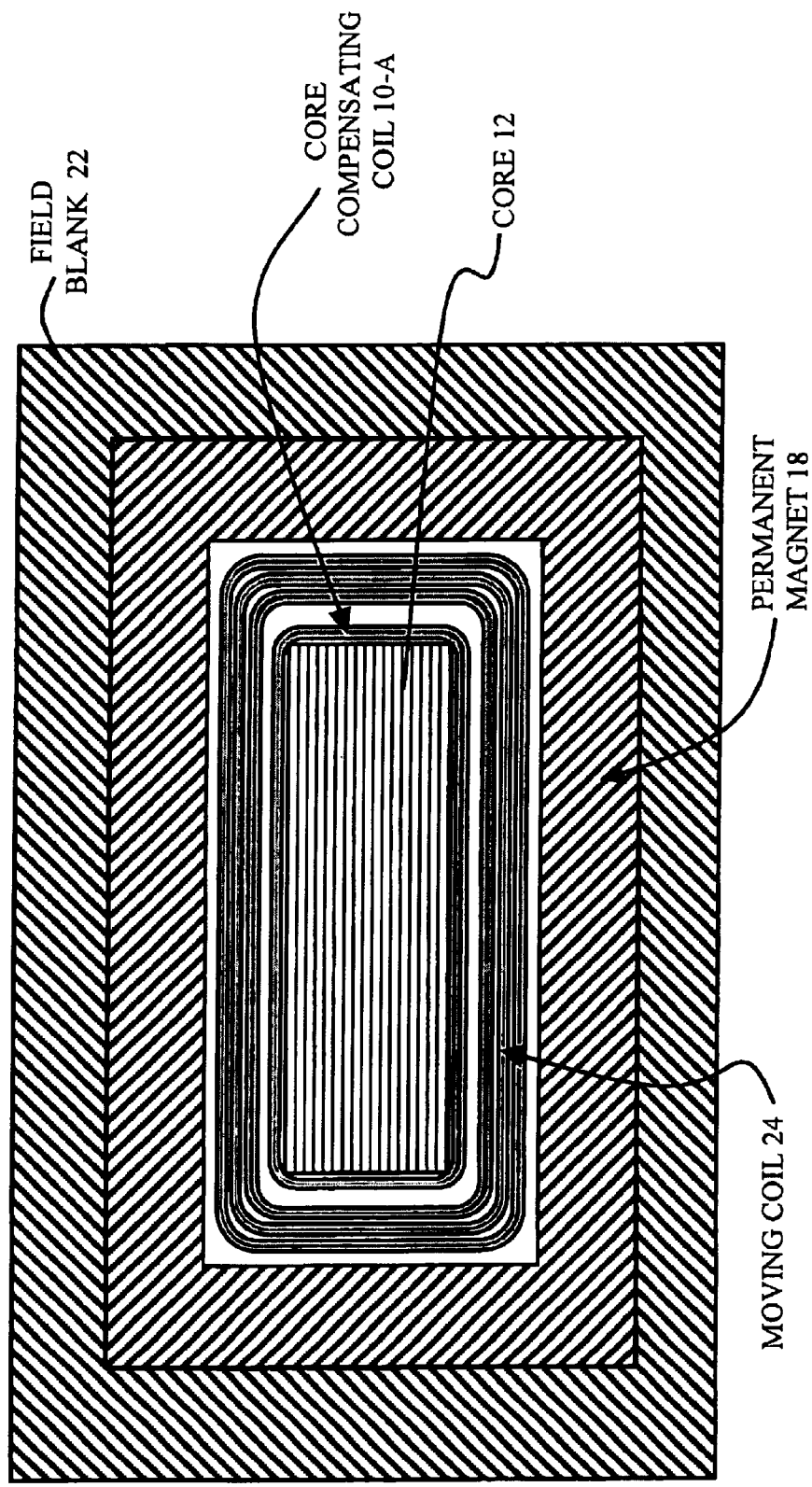
FIG. 9 is a simplified cross section of a rectangular embodiment of the present invention taken transverse to the direction of motion of the moving coil, through the field blank, the permanent magnet, the moving coil, the compensating coil, and the core.
Figure 10:
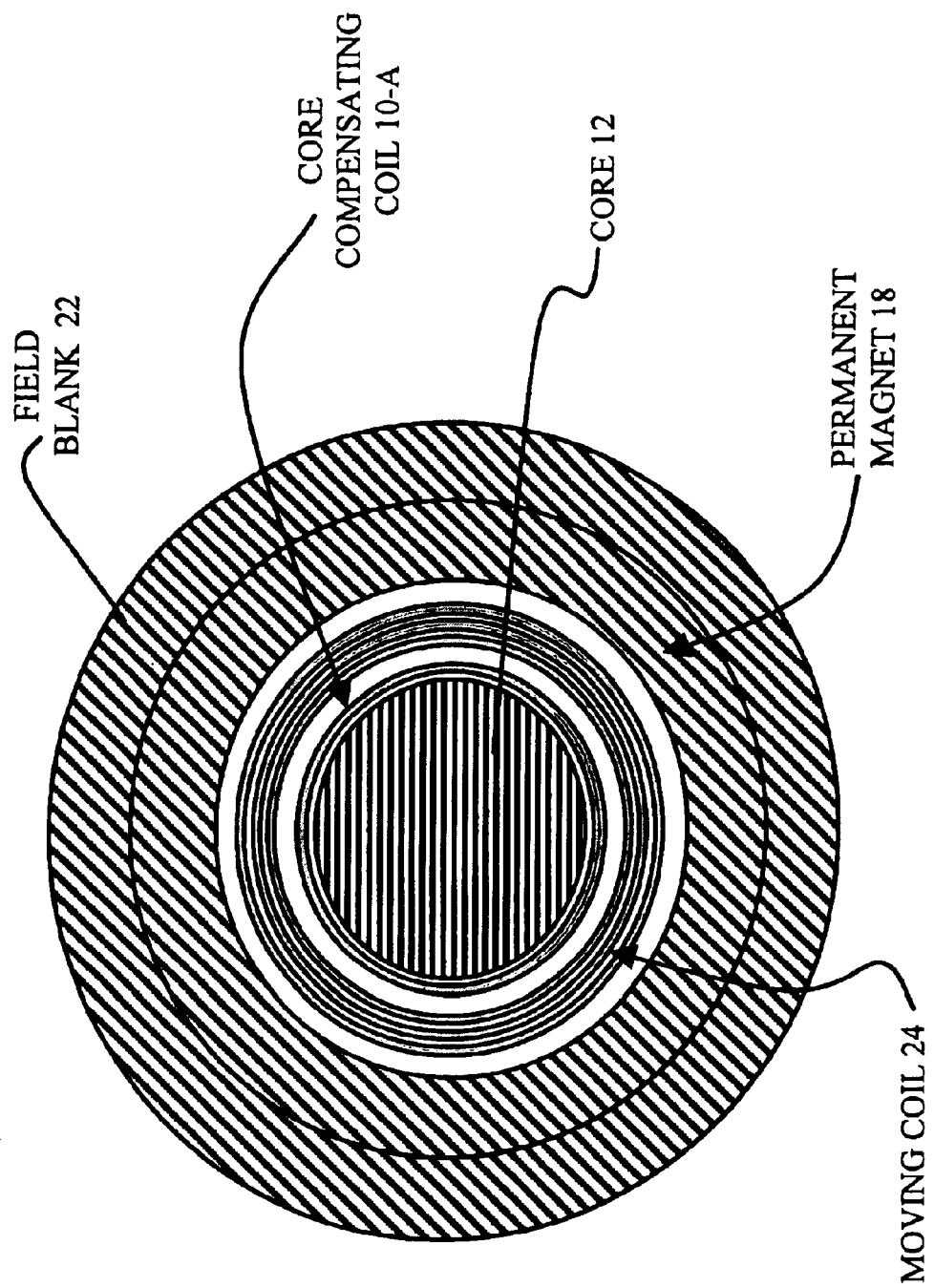
FIG. 10 is a simplified cross section of a cylindrical embodiment of the present invention taken transverse to the direction of motion of the moving coil, through the field blank, the permanent magnet, the moving coil, the compensating coil, and the core.

FIGS. 9 and 10 provide cross-sectional views of rectangular and cylindrical configurations, respectively, of the voice coil actuator of the present invention. These views are taken transverse to the direction of motion of moving coil 24, so that transverse cross sections of the field blank, permanent magnet, core compensating coil, and core can be seen.

In the embodiment of FIG. 1, permanent magnet 18 has a rectangular shape. The field blank 22 has a rectangular shape and closed ends. Permanent magnet 18 is positioned on the inside surface of the field blank and has a length which is selected so that cavities 14 and 16 are defined between the inside surfaces 20 of the ends of the field blank 22 and the permanent magnet 18. The inner dimension of permanent magnet 18 and the outer dimension of core 12 are selected so that a gap is formed between them. The moving coil 24 is constructed to be positionable in and to be moveable along this gap. Although not shown, those of ordinary skill will recognize that the moving coil 24 can be controlled through connections which extend to the exterior of field blank 22, in a conventional manner.

In the closed-ended embodiment of the present invention, compensating coils 10-B or 10-C can be positioned in one or both of the cavities 14 or 16, respectively, which have been formed between the permanent magnet 18 and the inside surfaces 20 of the field blank 22. Alternatively, a core compensating coil 10-A can be employed which is wound around the core. The core compensating coil 10-A can be constructed to extend substantially the entire length of the core 12.

The structure provided in FIG. 1 permits the altering of the distribution of the flux density in the gap. In turn, this permits the control of the flux density as a function of the stoke. Thus, by controlling the magneto-motive force (MMF) in the compensating coils, one is able to control the characteristics of the actuator to have, for example constant force across the stroke, or other desired performance characteristic.

Figure 8:
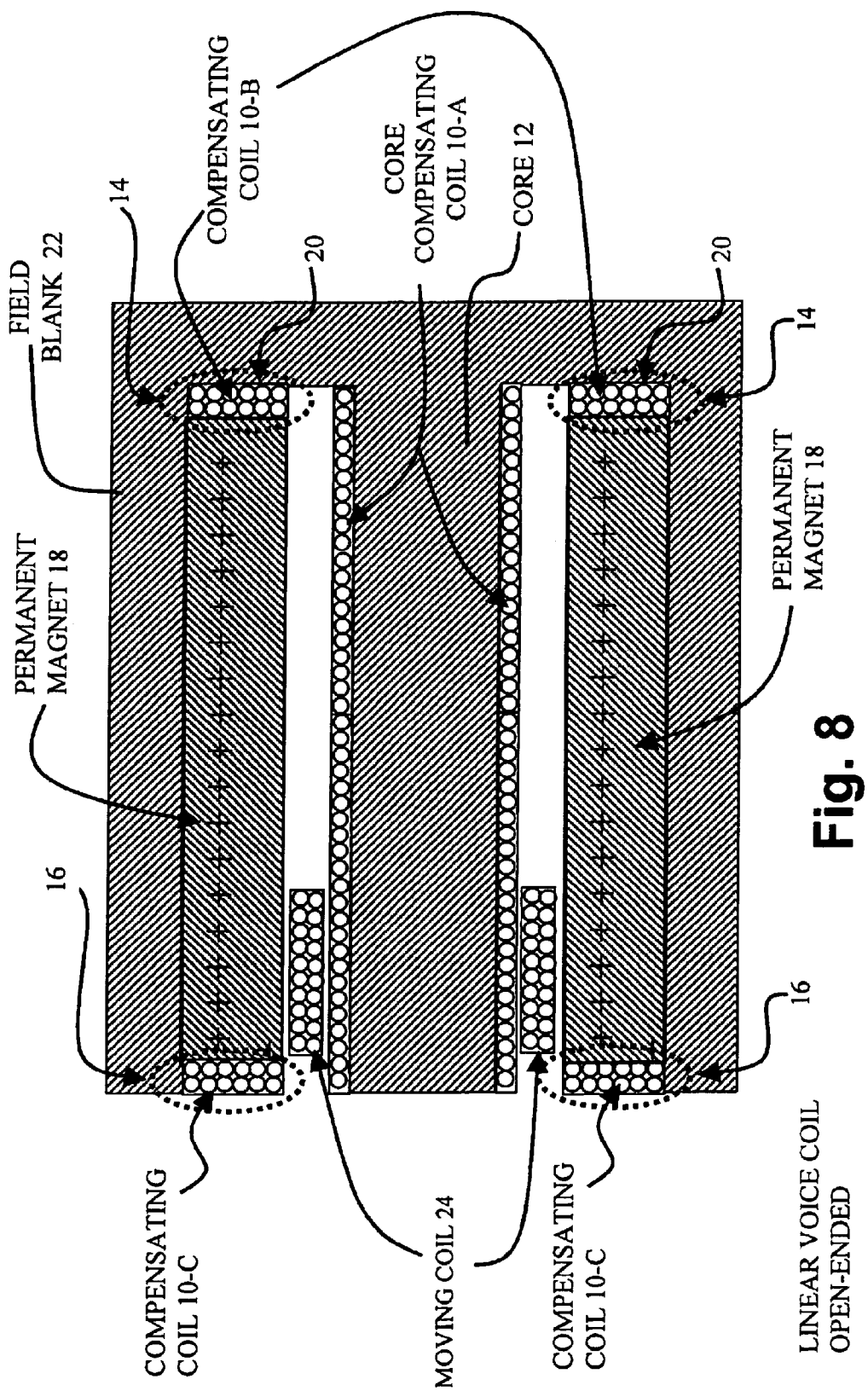
FIG. 8 is a simplified cross section of an open-ended linear voice coil actuator embodiment of the present invention, illustrating the positioning of compensating coils in spaces between the magnets and inside walls of the magnetic structure.

The open-ended embodiment of FIG. 2 is similar to that of FIG. 1, except that one end of the field blank is open. FIG. 8 illustrates an open-ended embodiment of the present invention in which compensating coils 10-B and 10-C are positioned in spaces 14 and 16.

Stationary compensating coils 10-A, 10-B and 10-C can be connected in series with the moving coil 24 in such a way that their magnetic fluxes work against magnetic flux created by current in the moving coil 24, thereby reducing armature reaction and resultant inductance, and leading to a faster response of the actuator. In this case, a new Force vs. Stroke curve would generally reflect the increased output force throughout the stroke.

Figure 7:
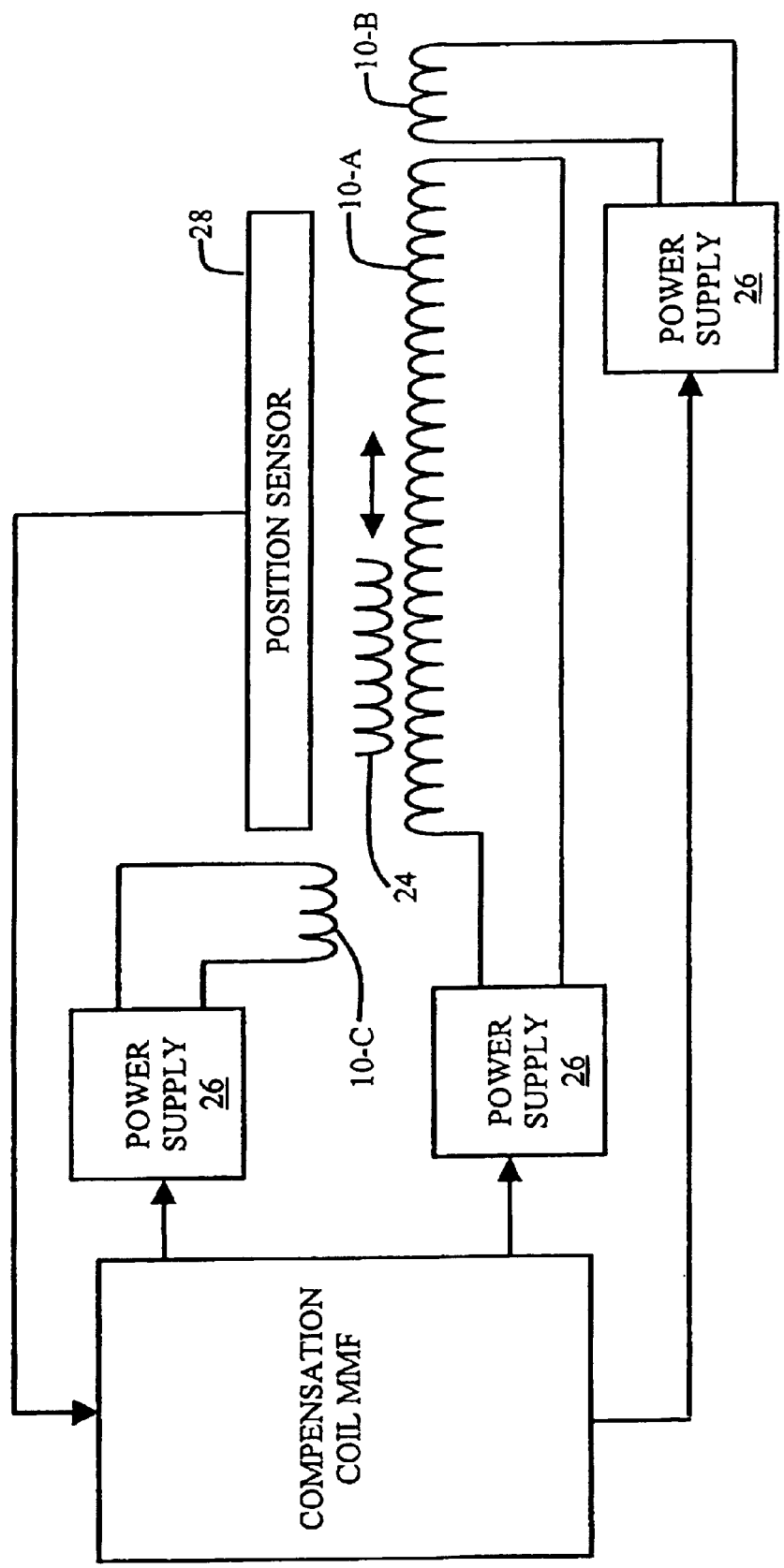
FIG. 7 is a simplified functional block diagram illustrating the connection of the compensating coils to separate power supplies with the value of the compensating current to the compensating coils being controlled as a function of stroke in accordance with the present invention.

However, if there is a need for a "tailored" force throughout most of the stroke, then the compensating coils should be connected to a separate power supply 26, as shown in FIG. 7. A position feedback device 28 will be used for effective control of the compensating current value as a function of stroke. Examples of such compensating current are provided in the curves depicting magneto-motive force in Ampere-turns vs. stroke for a given constant value of the output force of FIG. 3 and FIG. 4.

Figure 3:
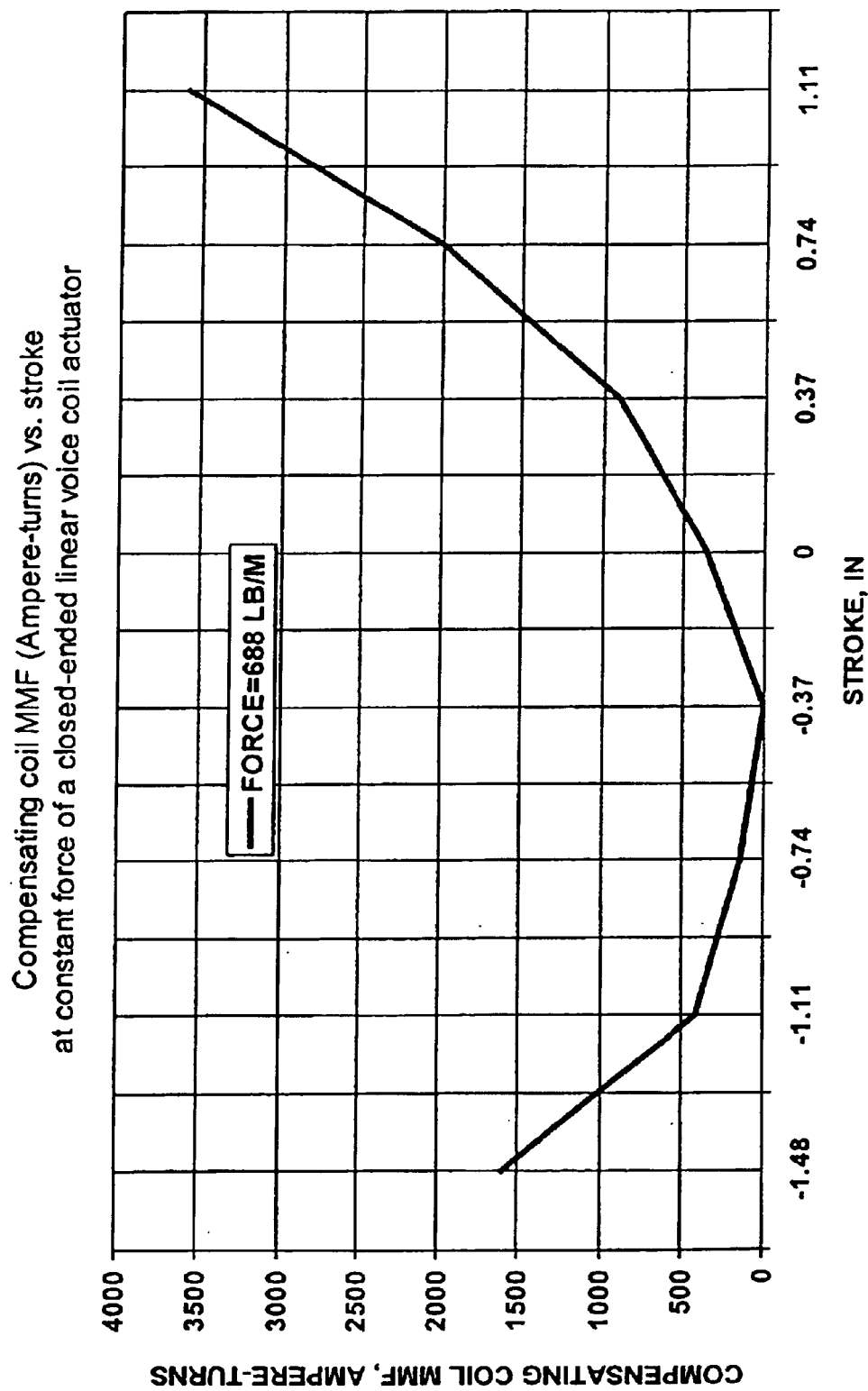
FIGS. 3 and 4 depict required magneto-motive force in Ampere-turns vs. stroke for a given constant value of the output force of compensating coils positioned in at the ends of the magnets, and around the core, respectively, in accordance with the present invention.

FIG. 3 shows the compensating coil MMF in ampere-turns, as a function of the stroke at a constant force of 688 LB/M, for compensating coils 10-B and 10-C. Thus, for example, from FIG. 3 it can be seen that at a stroke position of −0.92, the MMF for compensating coil 10-C can be controlled to be 1000 ampere-turns so that the actuator provides a force of 688 LB/M at that point of the stroke. The MMF to be provided in the compensating coils 10-C and 10-B, can be identified from FIG. 3 in a similar manner for other moving coil positions.

Figure 4:
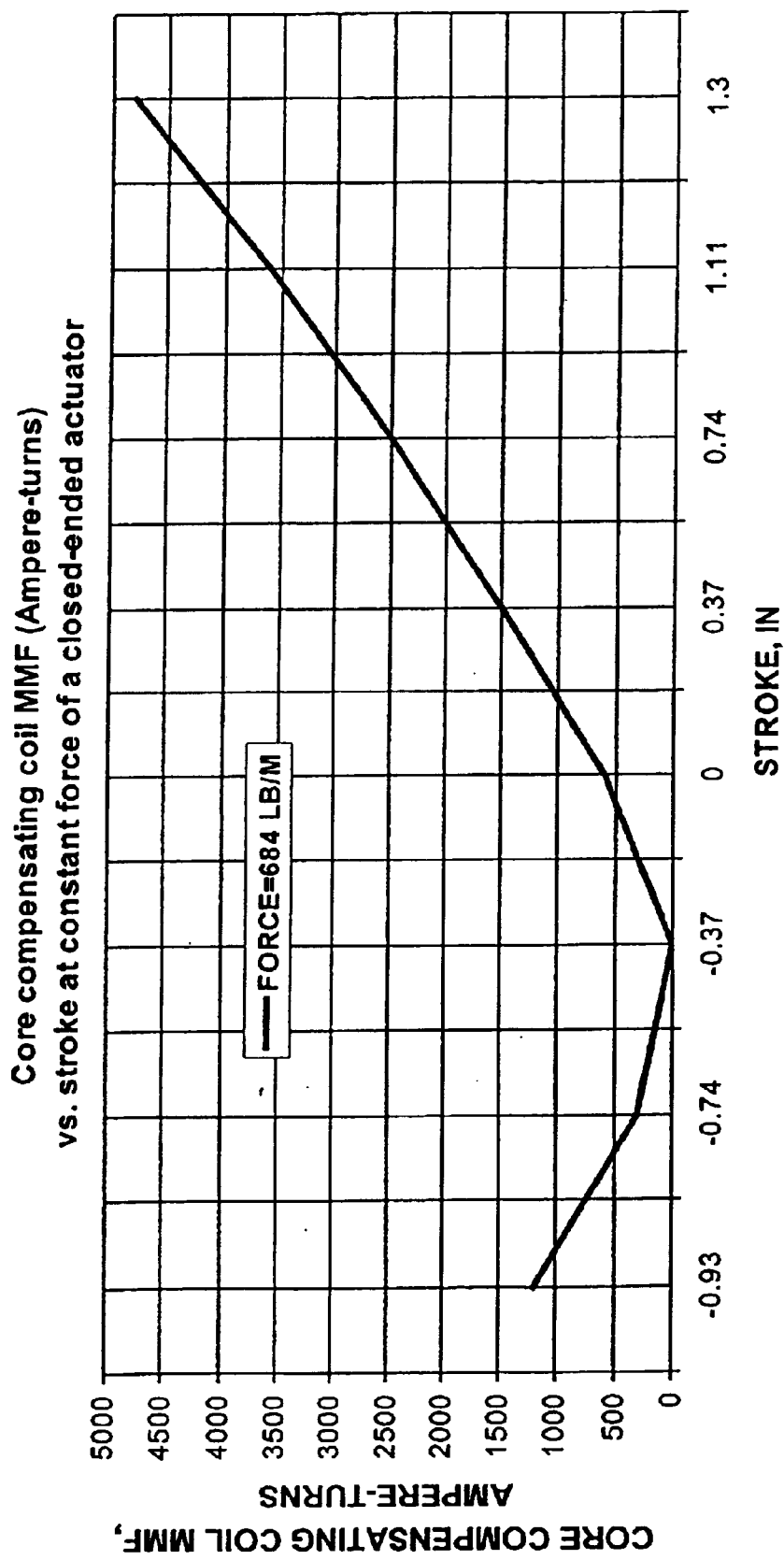

FIG. 4 shows the core compensating coil MMF in ampere-turns, as a function of the stroke at a constant force of 684 LB/M, for core compensating coil 10-A. For example, from FIG. 4 it can be seen that at a stroke position of 0.37, the MMF for core compensating coil 10-A can be controlled to be 1500 ampere-turns so that the actuator provides a force of 684 LB/M at that point of the stroke. The MMF to be provided in the core compensating coil 10-A, can be identified from FIG. 4 in a similar manner for other moving coil positions.

Comparison of the above curves of FIGS. 3 and 4 shows that compensating coils 10-B and 10-C, located in the spaces 14 and 16 between the magnets 18 and inside walls 20 of the magnetic structure, tend to be more effective at the beginning of the stroke, whereas core compensating coils 10-A seem to widen a constant force region toward the end of the stroke considering left-to-right movement of the coil.

Figure 5:
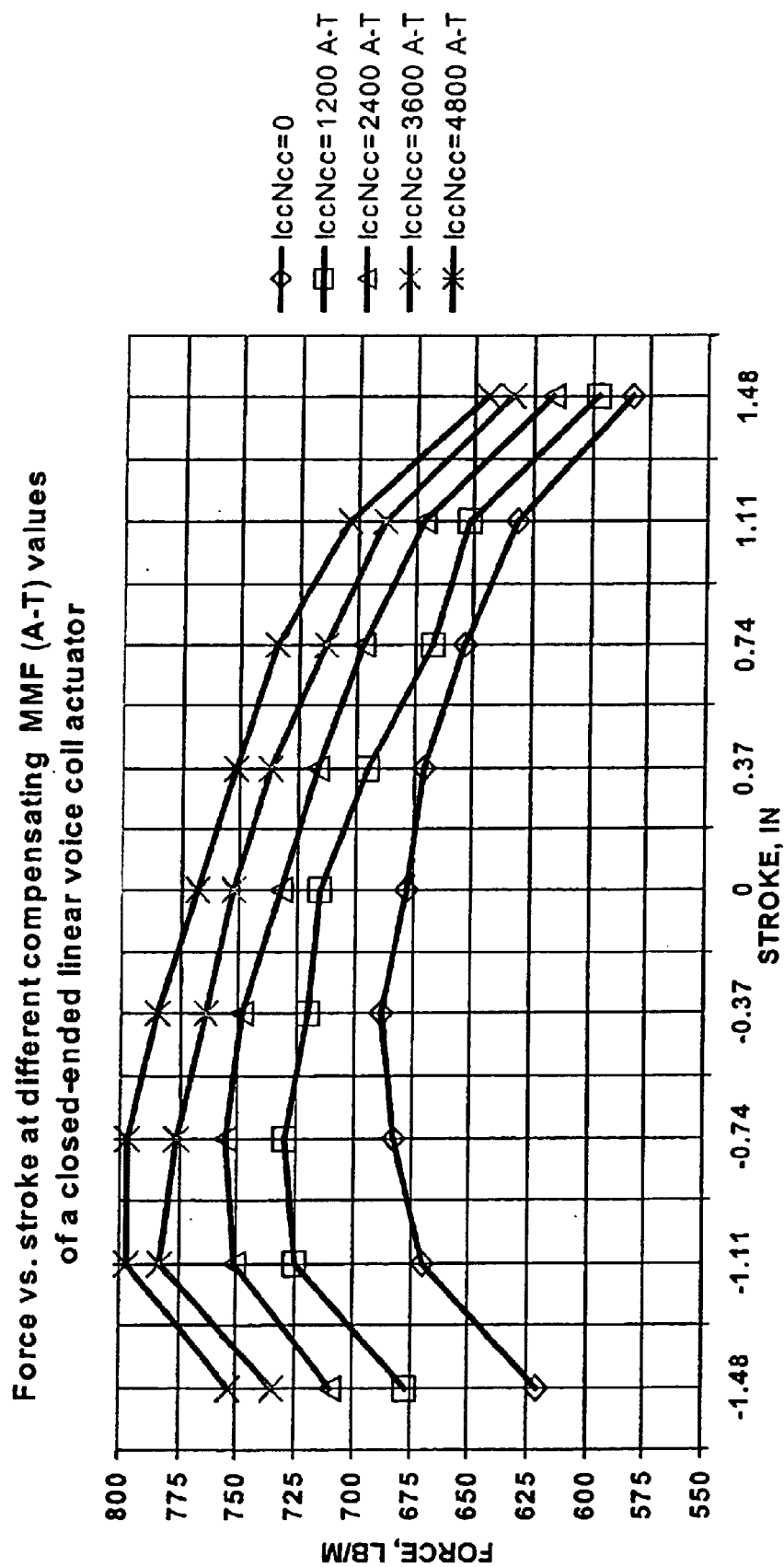
FIGS. 5 and 6 depict Force vs. Stroke characteristics with two different types of compensating coils in accordance with the present invention.
Figure 6:
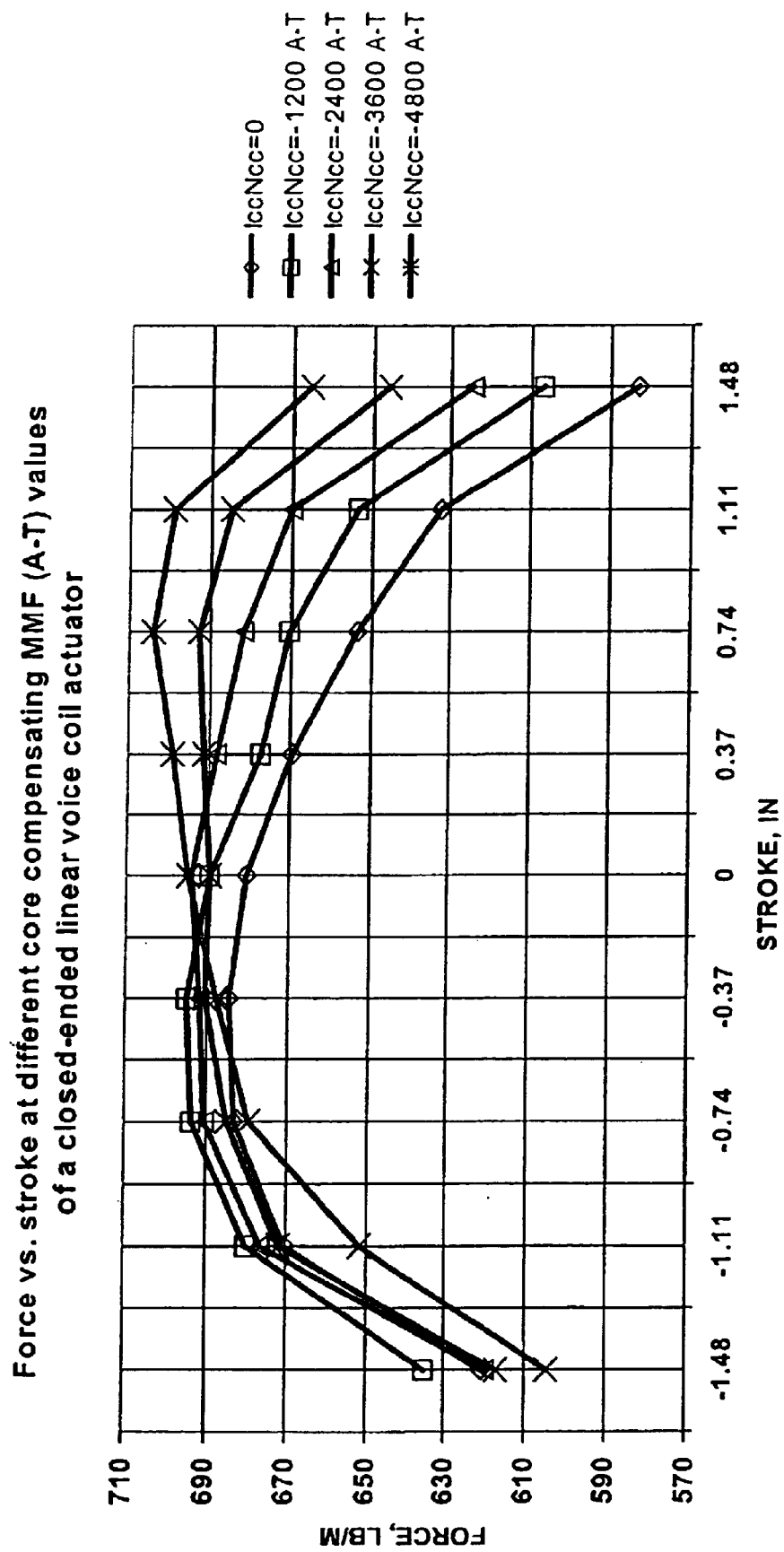

The Force vs. Stroke characteristics with the two different types of compensating coils are presented in FIG. 5 and FIG. 6. FIG. 5 illustrates the force vs. stroke characteristics using compensating coils such as 10-B and 10-C, while FIG. 6 illustrates the force vs. stroke characteristics using core compensating coils, such as 10-A. In FIGS. 5 and 6, the curve plotting the points indicated by the diamond symbols represents the condition where the applied MMF ($I_{cc}N_{cc}$) equals 0 ampere-turns (A-T). The other curves represent provided MMFs as follows:

| SYMBOL | MMF (A-T) |
|---|---|
| square box | 1200 |
| "x" | 3600 |
| "x" over-striking vertical line | 4800 |

From FIG. 5, it can be seen that as increasing MMF is provided in the compensating coils 10-B or 10-C, the force towards the end of the stroke can be increased by the compensating coils in a proportionately greater degree than the rest of the stroke. Conversely, from FIG. 6, it can be seen that the effect of core compensating coil 10-A on the force produced by the actuator is shifted toward the center of the stroke as compared to that for compensating coils 10-C or 10-B.

Depending upon a particular application, both types of the compensating coils 10-A and 10-B, 10-C can conceivably be utilized.

It should be noted that the utilization of such compensating coils increases the input power to the actuator. However, the increased dissipation occurs in the stationary coils attached to a relatively large heat sink, as opposed to a moving coil which does not have such a heat sink. Further, heat generated within a moving coil doesn't change.

The compensating coil arrangement has been described as applied to linear voice coil actuators as an example only. The same approach can be used on rotary voice coil actuators.

The terms and expressions which have been employed herein are intended as terms of description and not of limitation, and there is no intent in the use of such terms and expressions of excluding equivalents of the features shown and described, or portions thereof, it being recognized that various modifications are possible within the scope of the invention claimed.

What is claimed is:

1. A voice coil actuator comprising a core having an axis;

a permanent magnet having a longitudinal axis, and positioned so that the longitudinal axis of the permanent magnet is substantially parallel to the axis of the core;

a moving coil positioned to interact with the permanent magnet along the axis of the core; and a compensating coil positioned apart from and to interact with the moving coil, wherein a magnitude of a magneto-motive force in the compensating coil is adjusted as a function of a position of the moving coil.

2. An actuator comprising
a core;
a permanent magnet having a longitudinal axis, and positioned so that the longitudinal axis of the permanent magnet is substantially parallel to an axis of the core;
a moving coil positioned to interact with the permanent magnet along the axis of the core; and
a compensating coil positioned apart from and to interact with the moving coil and having a magneto-motive force having a magnitude which is adjusted as a function of a position of the moving coil.

3. The actuator of claim 1 or 2, wherein the compensating coil is positioned about the core.

4. The actuator of claim 3, wherein the compensating coil extends along substantially the entire length of the core.

5. The actuator of claim 1 or 2, further including
a position sensor responsive to the position of the moving coil; and
a power supply responsive to the position sensor and coupled to power the compensating coil.

6. The actuator of claim 4, wherein the actuator is closed-ended.

7. The actuator of claim 4, wherein the actuator is open-ended.

8. The actuator of claim 1 or 2, wherein the actuator has a rectangular cross section.

9. The actuator of claim 1 or 2, wherein the actuator has a cylindrical shape.

10. An actuator comprising
a core;
a permanent magnet having a longitudinal axis, and positioned so that the longitudinal axis of the permanent magnet is substantially parallel to an axis of the core;
a moving coil positioned to interact with the permanent magnet along the axis of the core; and
a compensating coil positioned to interact with the moving coil and having a magneto-motive force having a magnitude which is adjusted as a function of a position of the moving coil;
wherein the permanent magnet is positioned with respect to the core to define a cavity between the core and an end of the permanent magnet; and further wherein the compensating coil is positioned in the cavity.

11. The actuator of claim 10, wherein the compensating coil fills the cavity.

12. The actuator of claim 10, wherein a second cavity is defined at another end of the permanent magnet between the permanent magnet and the core, and further wherein a further compensating coil is positioned in the second cavity.

13. A voice coil actuator comprising:
a field blank which forms a housing;
a core;
a permanent magnet having a longitudinal axis, and positioned so that the longitudinal axis of the permanent magnet is substantially parallel to an axis of the core;
a coil positioned about the core to be moveable along and to interact with the permanent magnet along the axis of the core, wherein magnetic flux is produced in an air gap between the moveable coil and the permanent magnet;
a compensating coil positioned apart from and to interact with the moveable coil; and
a power supply coupled to the compensating coil so that magneto-motive force is produced in the compensating coil of a magnitude which is adjusted as a function of positions of the moveable coil along the core to alter the magnetic flux in the air gap.

14. The voice coil actuator of claim 13, wherein the compensating coil is positioned about the core.

15. A voice coil actuator comprising:
a field blank which forms a housing;
a core;
a permanent magnet having a longitudinal axis, and position so that the longitudinal axis of the permanent magnet is substantially parallel to an axis of the core;
a coil positioned about the core to be moveable along and to interact with the permanent magnet along the axis of the core, wherein magnetic flux is produced in an air gap between the moveable coil and the permanent magnet;
a compensating coil positioned to interact with the moveable coil; and
a power supply coupled to the compensating coil so that magneto-motive force is produced in the compensating coil of a magnitude which is adjusted as a function of positions of the moveable coil along the core to alter the magnetic flux in the air gap, in which the core, the permanent magnet, the moving coil and the compensating coil are positioned in the housing formed by the field blank, and wherein the compensating coil is further positioned at an end of the permanent magnet along the longitudinal axis of the permanent magnet and in a cavity between the permanent magnet and the field blank.

16. The voice coil actuator of claim 15, wherein the voice coil actuator has a rectangular cross section.

17. An actuator comprising
a core;
a permanent magnet having a longitudinal axis, and positioned so that the longitudinal axis of the permanent magnet is substantially parallel to an axis of the core;
a moving coil positioned to interact with the permanent magnet along the axis of the core; and
a compensating coil positioned to interact with the moving coil and having a magneto-motive force having a magnitude which is adjusted as a function of a position of the moving coil;
wherein the permanent magnet is positioned with respect to the core to define a cavity between the core and an end of the permanent magnet; and further wherein the compensating coil is positioned in the cavity.

18. The actuator of claim 17, wherein the compensating coil fills the cavity.

19. The actuator of claim 17, wherein a second cavity is defined at another end of the permanent magnet between the permanent magnet and the core, and further wherein a further compensating coil is positioned in the second cavity.

* * * * *